3,297,788
COLOR MODIFICATION OF COBALT-CONTAIN-
ING CURED POLYESTER RESINS
Alan Dun, Lower Templestowe, Victoria, and David
Brian Fox, South Yarra, Victoria, Australia, assignors
to Monsanto Chemicals (Australia) Limited, Footscray,
Victoria, Australia, a company of Victoria
No Drawing. Filed Sept. 9, 1964, Ser. No. 395,327
14 Claims. (Cl. 260—863)

This invention relates to the production of cured polyester resins and is concerned with the modification of the color characteristics which develop in such resins in the curing stage, the invention particularly relating to the color modification of polyester resins cured with the aid of so-called cobalt accelerators.

Polyester resins are known to develop color during the curing stage of their production, the color marring or detracting from the appearance of the cured resin and tending to have an adverse effect on the commercial use of such resins. The color produced in polyester resins cured with the aid of a cobalt accelerator is generally pink or yellow, depending upon the quantity and type of polymerization inhibitor added to the polycondensation-copolymerizable monomeric mixtures used to produce polyester resins, in order to prevent premature polymerization of such mixtures, mainly when in storage, pending use for the production of the resin. Dyestuffs have been used to modify the color of the cured resin, in the curing stage, but this is not generally successful since most dyes are destroyed during the curing stage.

We have now found that the color characteristics which develop in polyester resins formed by the cobalt-accelerator curing of such polycondensation-copolymerizable monomeric mixtures can be advantageously modified for commercial purposes, by effecting the curing of such a polycondensation-copolymerizable monomeric mixture in the presence of a curing-accelerator amount of a cobalt-accelerator curing component chosen from: (A) a cobalt salt in association with a compound selected from (i) alkyl substituted 1,10-phenanthrolines in which said alkyl substituents are essentially in the 2- and 9- positions, (ii) aryl substituted 1,10-phenanthrolines in which said aryl substituents are essentially in the 2- and 9- positions, (iii) alkyl and aryl substituted 1,10-phenanthrolines in which some of said substituents are essentially in the 2- and 9- positions, (iv) alkyl substituted 2,2'-bipyridines in which said alkyl substituents are essentially in the 6- and 6'- positions, (v) aryl substituted 2,2'-bipyridines in which said aryl substituents are essentially in the 6- and 6'-positions, (vi) alkyl and aryl substituted 2,2'-bipyridines in which some of said substituents are essentially in the 6- and 6'- positions, and (vii) mixtures of any of said 1,10-phenanthroline and 2,2'-bipyridine compounds specified in (i), (ii), (iii), (iv), (v) and (vi) above; (B) a cobalt complex resulting from the reaction of a cobalt salt with a complexing compound selected from the 1,10-phenanthrolines and 2,2'-bipyridines as specified in (i), (ii), (iii), (iv), (v) and (vi) above, and mixtures of the compounds as specified in (vii) above; and (C) a mixture of a cobalt salt and a cobalt complex specified in (B) above.

The cobalt-accelerator curing component employed in accordance with the invention preferably is chosen from: (A) a cobalt salt in association with a compound selected from (i) alkyl substituted 1,10-phenanthrolines in which said alkyl substituents are essentially in the 2- and 9- positions, (ii) aryl substituted 1,10-phenanthrolines in which said aryl substituents are essentially in the 2- and 9- positions, (iii) alkyl and aryl substituted 1,10-phenanthrolines in which some of said substituents are essentially in the 2- and 9- positions, and (iv) mixtures of any of said 1,10-phenanthrolines specified in (i), (ii) and (iii) above; (B) a cobalt complex resulting from the reaction of a cobalt salt with a complexing compound selected from the 1,10-phenanthrolines as specified in (i), (ii) and (iii) above, and mixtures of such compounds as specified in (iv) above; and (C) a mixture of a cobalt salt and a cobalt complex specified in (B) above.

We have verified that the presence of a 1,10-phenanthroline and/or a 2,2'-bipyridine as specified above, in a polycondensation-copolymerizable monomeric mixture containing a cobalt accelerator, results, in the curing stage leading to the production of a polyester resin, in the formation of a cobalt complex by reaction of the cobalt accelerator with the 1,10-phenanthroline and/or 2,2'-bipyridine. The advantage of this is that the cobalt complex so formed is not readily oxidized by peroxides and apparently is not completely decolorized by free radicals used in the curing stage. Arising from this, the present invention accordingly contemplates the presence in the polycondensation-copolymerizable monomeric mixture of a preformed cobalt complex as indicated above. In either instance, the resultant mixture of polymerizable material and cobalt-accelerator curing component is subjected to a curing stage whereby a polyester resin is produced in which the color characteristics are suitably modified for commercial purposes. The preformed complexes or the complexes formed in situ are tetrahedral and intensely colored similar to many other divalent cobalt complexes and are very difficult to oxidize, which is contrary to the general behaviour of cobaltous complexes, which are either easily oxidized or decomposed by peroxides.

Alkyl substituents in the 1,10-phenanthrolines and the 2,2'-bipyridines as specified preferably contain from 1 to 8 carbon atoms and may be straight chain or branched, the preferred substituents of the class being methyl, ethyl and n-propyl, the dimethyl and tetramethyl substituents being still further preferred. Aryl substituents in the 2,2'-bipyridines preferably are selected from phenyl, tolyl and xylyl. Representative members of the alkyl and/or aryl substituted 1,10-phenanthrolines or 2,2'-bipyridines which can be so employed in carrying out the invention include 2,9-dimethyl-1,10 - phenanthroline; 2,4,7,9 - tetramethyl-1,10-phenanthroline; 2,9 - diethyl-3,8-di-n-propyl-1,10-phenanthroline; 2,9-diphenyl - 1,10 - phenanthroline; 2,9-dimethyl-4,7-diphenyl - 1,10 - phenanthroline; 6,6'-dimethyl - 2,2'-bipyridine; and 4,4',6,6'-tetramethyl-2,2'-bipyridine.

Cobalt salts useful as polymerization accelerator in conjunction with the 1,10-phenanthroline or the 2,2'-bipyridine component, in the curing of polycondensation-copolymerizable monomeric mixtures according to the invention are inorganic or organic cobalt salts sufficiently soluble in the polymerization system and sufficiently stable to act as polymerization accelerator. Suitable inorganic cobalt salts include salts of the formula $CoX_2$ wherein X is selected from chlorine, bromine, iodine, thiocyanate and cyanate. Suitable organic cobalt salts include salts derived from saturated and unsaturated aliphatic acids, particularly aliphatic acids containing from 1 to 17 carbon atoms. Representative organic cobalt salts include the cobalt salts of napthenic acid, however, the preferred organic cobalt salt for the purpose is the cobalt salt of 2-ethyl hexoic acid.

Preformed cobalt complexes useful as accelerators in the curing of polycondensation-copolymerizable monomeric mixtures according to the invention likewise are cobalt complexes sufficiently soluble in the polymerization system and sufficiently stable to act as polymerization accelerator. Such complexes are the type having a structural formula selected from:

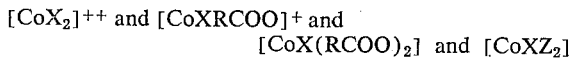

wherein X represents the 1,10-phenanthroline or 2,2'-bipyridine; wherein R in the group RCOO represents an alkyl radical having from 1 to 17 carbon atoms; wherein RCOO in the group $(RCOO)_2$ represents a naphthenic acid radical; and wherein Z is an acid radical preferably selected from chlorine, bromine, iodine, thiocyanate and cyanate. Representative complexes include dichloro-2,9-dimethyl-1,10-phenanthroline cobalt (II); dibromo-2,9-dimethyl-1,10-phenanthroline cobalt (II); diiodo-2,9-dimethyl-1,10-phenanthroline cobalt (II); dithiocyanato-2,9-dimethyl-1,10-phenanthroline cobalt (II); bis(2,9-dimethyl-1,10-phenanthroline) cobalt (II) perchlorate; and dichloro-4,4',6,6'-tetramethyl-2,2'-bipyridine cobalt (II). These representative complexes can, in the same order, be given a short structural formula as follows:

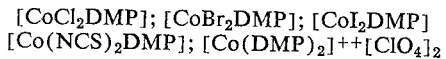

and [$CoCl_2TMB$], wherein DMP represents 2,9-dimethyl-1,10-phenanthroline and TMB represents 4,4',6,6'-tetramethyl-2,2'-bipyridine. Each said complex is a solid at room temperature and has a color correspondingly indicated as follows:

Complex:                                Color
  [$CoCl_2DMP$] _____ Blue.
  [$CoBr_2DMP$] _____ Blue-green.
  [$CoI_2DMP$] _____ Green.
  [$Co(NCS)_2DMP$] _____ Dark blue.
  [$Co(DMP)_2$]$^{++}$[$ClO_4$]$_2$ _____ Purple.
  [$CoCl_2TMB$] _____ Blue.

Polycondensation-copolymerizable monomeric mixtures used in the production of polyester resins are well known to comprise essentially a polycondensation product in a copolymerizable ethylenically unsaturated monomer, said polycondensation product being derived from (i) saturated polybasic acids, (ii) ethylenically unsaturated polybasic acids, and (iii) polyhydric alcohols, the polycondensation product cross-linking with said monomer in the curing stage to form the polyester resin. Saturated acids so defined include phthalic anhydride, isophthalic acid, hexachloro endomethylene-tetrahydro phthalic acid, adipic acid, sebacic acid, tetrachloro phthalic acid and tetrabromophthalic acid. Unsaturated acids so defined include maleic acid, fumaric acid, and itaconic acid. Polyhydric alcohols so defined include 1,2-propylene glycol, ethylene glycol, diethylene glycol, triethylene glycol, polyethylene glycols, dipropylene glycol, polypropylene glycol, glycerol, pentaerythritol, trimethylol propane, and mono-glycerides of natural oils such as linseed oils. Copolymerizable ethylenically unsaturated monomers so defined include styrene, α-methyl-styrene, methyl methacrylate, ethyl acrylate, n-butyl acrylate, iso-butyl acrylate, 2-ethylhexyl acrylate and diallyl phthalate.

In general, the amount of cobalt complex formed in the curing of the polycondensation-copolymerizable monomeric mixture (hereinafter invariably and more conveniently referred to as the polymeric-monomeric mixture), or, correspondingly the amount of preformed cobalt complex added to the polymeric-monomeric mixture preferably is in the range of 0.0005 to 0.006% by weight, expressed as cobalt metal and based on the weight of cured resin. In the case where the complex is formed in situ, the amount of 1,10-phenanthroline and/or 2,2'-bipyridine component which is added to the polymeric-monomeric mixture for the purpose preferably is in the range of 0.001 to 0.02% by weight based on the weight of the cured resin, the amount of cobalt salt being added for reaction with said 1,10-phenanthroline and/or 2,2'-bipyridine component preferably being in the range of 0.001 to 0.02% by weight, expressed as cobalt metal and based on the weight of cured resin.

The method of the invention is conveniently carried out by adding a 1,10-phenanthroline and/or 2,2'-bipyridine component as specified to the polymeric-monomeric mixture, then adding a cobalt salt to said polymeric-monomeric mixture, then effecting the curing stage; or adding a mixture of the 1,10-phenanthroline and/or 2,2'-bipyridine component and the cobalt salt to said polymeric-monomeric mixture and effecting the curing stage; or adding a preformed cobalt complex as specified to said polymeric-monomeric mixture and effecting the curing stage. In the case where cobalt complexes of the type [$CoXZ_2$] are utilized, such complexes are conveniently formed by adding the 1,10-phenanthroline and/or 2,2'-bipyridine component to said polymeric-monomeric mixture, then adding a source of cobalt and the appropriate acid or salt which provides the Z component of such complex. In practice, complexes of the [$CoXZ_2$] type should be soluble to some extent in the nonaqueous solvents used in polyester polymerization systems, otherwise the acid or salt which provides the Z component of such complexes will precipitate when added to the polymeric-monomeric mixture. The salt which provides the Z component of such complexes conveniently is of the type LiCl, KBr, KI or KCNS. Said salts may be dissolved in nonaqueous solvents and the resultant solution added to the polymeric-monomeric mixture.

When the procedure of forming the cobalt complex in situ in the curing stage is adopted, it is advisable to have a molar excess of the cobalt salt component, related to the amount of 1,10-phenanthroline and/or 2,2'-bipyridine component, in order to cure the resin within an acceptable period of time, e.g., within about 20 minutes. The cure rate of the polymeric-monomeric mixture is much slower using solely a cobalt complex in conjunction with a conventional polymerization initiator or catalyst, however, the use of an excess amount of cobalt salt accelerator together with the presence of the cobalt complex enables the curing rate to be varied advantageously, depending on the concentration of the cobalt accelerator component as a whole and the color desired in the cured resin.

Curing of the polymeric-monomeric mixture containing a cobalt-accelerator curing component in accordance with the invention, can be effected with the aid of any conventional polymerization initiator or curing catalyst used in the production of polyester resins, examples of such curing catalysts being methyl ethyl ketone peroxide, methyl isobutyl ketone peroxide, methyl amyl ketone peroxide, and cyclohexanone peroxide. The curing is known to take place by a free radical mechanism, the polymeric-monomeric mixture containing the cobalt-accelerator curing component and the polymerization initiator or curing catalyst being heated to a temperature within the range of about 15° C. to about 70° C. In carrying out the curing stage, a convenient procedure is to add the polymerization initiator or catalyst such as methyl ethyl ketone peroxide to the polymeric-monomeric mixture containing the cobalt-accelerator curing component according to the invention, and stir the initiator or catalyst into said mixture, at this stage the composition being ready for application as a surface coating or for working into a fibre glass laminate or other similar application for polyester resins. The resin is left until first gelation has taken place and thus has finally cured, whereupon the coating or article is subjected to any suitable finishing treatment, as required. The concentration of the polymerization initiator or catalyst depends primarily upon the required gel time, the amount generally being in the order of 0.1% to 4% based on the weight of the cured resin.

The following non-limitative practical examples illustrate the invention.

EXAMPLE I

Part A

A typical polymeric-monomeric mixture suitable for the production of a polyester resin was prepared as follows: Phthalic anhydride (185 gm.), maleic anhydride (123 gm.) and propylene glycol (209 gm.) were weighed into a four necked flask equipped with a condenser, a stirrer, a thermometer pocket and a gas inlet tube. The carbon dioxide supply was turned on at a slow rate and stirring and heating commenced. The mixture in the flask was held at 200° C. for 2 hours and then the water produced by the reaction distilled off until the acid value (number) was 50. The resin mixture was then cooled to 150° C. and poured into styrene (300 gm.) containing hydroquinone (0.018 gm.) and cooled to room temperature.

Part B

Proceeding according to the prior art, a portion of the resin mixture of Part A was cured with the cobalt salt of 2-ethyl hexoic acid and methyl ethyl ketone peroxide, resulting in a pink colored resin. The gel time of the resin was measured at 30° C. using 0.2 ml. of the cobalt salt of 2-ethyl hexoic acid (containing 4.5% cobalt) and 1.0 ml. of methyl ethyl ketone peroxide, in 50 gm. of resin. The result is summarized as:

30° C. gel time: 5½ mins.
Resin color: Pink

Part C

The effect on color and gel time of portion of the resin of Part A was observed and measured by adding 2,9-dimethyl-1,10-phenanthroline (0.01%) to said portion of the resin of Part A, together with 0.2 ml. of the cobalt salt of 2-ethyl hexoic acid (containing 4.5% cobalt) and 1.0 ml. of methyl ethyl ketone peroxide, as in Part B. The gel time was remeasured and the color of the cured resin observed. The result is summarized as:

30° C. gel time: 7 mins.
Resin color: Grey pink

Part D

The effect on color and gel time of the resin was observed and measured, using a portion of the resin mixture of Part A and varying concentrations of 2,9-dimethyl-1,10-phenanthroline, together with 0.2 ml. of the cobalt salt of 2-ethyl hexoic acid and 1.0 ml. of methyl ethyl ketone peroxide, in 50 gm. of resin. The result is summarized as follows:

| Concentration of 2,9-dimethyl 1,10-phenanthroline, percent | 25° C. Gel Time in mins. | Resin Color |
| --- | --- | --- |
| .005 | 7 | Pink. |
| .01 | 10 | Pink, trace blue. |
| .015 | 13 | Pink, more blue. |
| .02 | 16½ | Pale blue, some pink. |
| .025 | 24½ | Grey, blue. |

Part E

The effect on color and gel time of the resin was observed and measured, using a portion of the resin mixture of Part A and the same concentration of 2,9-dimethyl-1,10-phenanthroline, but complexed with varying concentrations of lithium chloride together with the cobalt salt and curing agent as in Part D. The result is summarized as follows:

| Concentration of 2,9-dimethyl 1,10-phenanthroline, percent | Concentration of LiCl, percent | 25° C. Gel Time in Mins. | Resin Color |
| --- | --- | --- | --- |
| .01 | .002 | 18¼ | Gradual gradation from pale brown to pale green. |
| .01 | .004 | 17¾ | |
| .01 | .008 | 18¼ | |
| .01 | .012 | 18 | |
| .01 | .016 | 21¼ | |
| .01 | .02 | 24 | |

Part F

The effect on color and gel time of portion of the resin of Part A was observed and measured by replacing the 2,9-dimethyl-1,10-phenanthroline component of Part C with 4,4',6,6'-tetramethyl-2,2'-bipyridine. The gel time was measured at 25° C. using 0.025 ml. of the cobalt salt of 2-ethyl hexoic acid (4.5% solution in kerosene) and 1.0 ml. of methyl ethyl ketone peroxide per 50 gms. of resin.

| Concentration of 4,4',6,6'-tetramethyl-2,2'-bipyridine, percent | 25° C. gel time in mins. | Resin Color |
| --- | --- | --- |
| .002 | 11½ | Pale orange. |
| .004 | 14½ | Pale orange grey. |
| .006 | 20 | Almost colorless. |
| .008 | 23 | Pale grey. |

Part G

The effect on color and gel time of portion of the resin of Part A was observed and measured by replacing the 2,9-dimethyl-1,10-phenanthroline component of Part C with 2,4,7,9-tetramethyl-1,10-phenanthroline. The cobalt salt of 2-ethyl hexoic acid (0.2 ml.) and methyl ethyl ketone peroxide (1.0 ml.) were used per 50 gms. of resin.

| Concentration of 2,4,7,9-tetramethyl-1,10-phenanthroline, percent | 25° C. gel time in mins. | Resin Color |
| --- | --- | --- |
| .004 | 7 | Gradation from pink to a grey color. |
| .006 | 8 | |
| .008 | 9 | |
| | 10 | |

In commercial practice, a polymerization inhibitor will be added to the polymeric-monomeric mixture containing the cobalt-accelerator curing component in accordance with the invention, in order to prevent premature polymerization of such mixture, mainly when in storage, pending use for the production of polyester resin. The amount of inhibitor added to the mixture so specified will be in the order of 0.0001 to 0.2% by weight based on the weight of the cured resin. Compounds which are known to be polymerization inhibitors for this purpose include hydroquinone, tert.-butyl catechol, benzoquinone, naphthoquinone, copper naphthenate, quaternary ammonium compounds and quaternary sulphonium compounds.

What is claimed is:

1. The method of modifying the color characteristics which develop in polyester resins formed by the cobalt-accelerator curing of polycondensation-copolymerizable monomeric mixtures, said method comprising the curing of such a polycondensation-copolymerizable monomeric mixture in the presence of a curing-accelerator amount of a cobalt-accelerator curing component selected from the class consisting of (A) a cobalt salt in association with a compound selected from a class consisting of (i) alkyl substituted 2,2'-bipyridines in which said alkyl substituents are essentially in the 6- and 6'-positions, (ii) aryl substituted 2,2'-bipyridines in which said aryl substituents are essentially in the 6- and 6'-positions, (iii) alkyl and aryl substituted 2,2'-bipyridines in which said substituents are essentially in the 6- and 6'-positions, and (iv) mixtures of the above substituted 2,2'-bipyridines; (B) a cobalt complex resulting from the reaction of a cobalt salt with a complexing compound selected from the class consisting of substituted 2,2'-bipyridines and mixtures thereof as specified in (i), (ii), (iii) and (iv) above; and (C) a mixture of a cobalt salt and a cobalt complex specified in (B) above; said polyester resin being the polymeric polycondensation reaction product of unsaturated dicarboxylic acids and polyols and said polycondensation-copolymerizable monomeric mixture being a mixture of an ethylenically unsaturated monomer and an unsaturated polyester which is the polymeric polycondensation reaction product of an unsaturated dicarboxylic acid and a polyol.

2. The method according to claim 1 wherein the amount of cobalt complex present in the cured resin is within the range of from 0.0005 to 0.006% by weight expressed as cobalt metal and based on the weight of cured resin.

3. The method according to claim 2 wherein said amount of cobalt complex is formed in the polycondensation-copolymerizable monomeric mixture in the curing stage by adding to said mixture a cobalt salt and a complexing compound selected from the class consisting of the substituted 2,2'-bipyridines as specified, the amount of cobalt salt added being in the range of from 0.001 to 0.02% by weight expresed as cobalt metal and based on the weight of cured resin, and the amount of complexing compound added being in the range of from 0.001 to 0.02% by weight based on the weight of cured resin.

4. The method according to claim 3 wherein the cobalt salt conforms to the formula $CoX_2$ wherein X is selected from the class consisting of chlorine, bromine, iodine, thiocyanate and cyanate, and wherein the complexing component is selected from the class consisting of 6,6'-dimethyl-2,2'-bipyridine; and 4,4',6,6'-tetramethyl-2,2'-bipyridine.

5. The method according to part B of claim 1 wherein the cobalt complex present in the cured resin has a structure conforming to a structural formula selected from the class consisting of $[CoX_2]^{++}$ and $[CoXRCOO]^+$ and $[CoX(RCOO)_2]$ and $[CoXZ_2]$ wherein X represents the complexing compound selected from the 2,2'-bipyridines as specified, wherein R represents an alkyl radical having from 1 to 17 carbon atoms, wherein RCOO in the group $(RCOO)_2$ represents a naphthenic acid radical, and wherein Z is an acid radical; the amount of cobalt complex present in the cured resin being within the range of from 0.0005 to 0.006% by weight expressed as cobalt metal and based on the weight of cured resin.

6. The method according to claim 1 wherein the cobalt complex present in the cured resin is dichloro-4,4',6,6'-tetramethyl-2,2'-bipyridine cobalt (II); the amount of cobalt complex present in the cured resin being within the range of from 0.0005 to 0.006% by weight expressed as cobalt metal and based on the weight of cured resin.

7. Polyester resins obtained by the method of claim 1.

8. A polycondensation-copolymerizable monomeric mixture comprising a polycondensation-copolymerizable monomeric mixture suitable for the production of a polyester resin and containing a curing-accelerator amount of a cobalt-accelerator curing component chosen from the class consisting of: (A) a cobalt salt in association with a compound selected from the class consisting of (i) alkyl substituted 2,2'-bipyridines in which said alkyl substituents are essentially in the 6- and 6'-positions, (ii) aryl substituted 2,2'-bipyridines in which said aryl substituents are essentially in the 6- and 6'-positions, (iii) alkyl and aryl substituted 2,2'-bipyridines in which said substituents are essentially in the 6- and 6'-positions, and (iv) mixtures of the above substituted 2,2'-bipyridines; (B) a cobalt complex resulting from the reaction of a cobalt salt with a complexing compound selected from the class consisting of substituted 2,2'-bipyridines and mixtures thereof as specified in (i), (ii), (iii) and (iv) above; and (C) a mixture of a cobalt salt and a cobalt complex specified in (B) above; said polyester resin being the polymeric polycondensation reaction product of unsaturated dicarboxylic acids and polyols and said polycondensation-copolymerizable monomeric mixture being a mixture of an ethylenically unsaturated monomer and an unsaturated polyester which is the polymeric polycondensation reaction product of an unsaturated dicarboxylic acid and a polyol.

9. A polycondensation-copolymerizable mixture according to claim 8 wherein said cobalt-accelerator curing component is present in said mixture in the form of a cobalt complex and in an amount which is within the range of from 0.0005 to 0.006% by weight expressed as cobalt metal and based on the weight of polyester resin resulting from the curing of said mixture.

10. A polycondensation-copolymerizable mixture according to claim 8 wherein said cobalt-accelerator curing component is present in said mixture in the form of a cobalt salt and a complexing compound selected from the class consisting of the 2,2'-bipyridines as specified, the amount of cobalt salt being in the range of from 0.01 to 0.02% by weight expressed as cobalt metal and based on the weight of polyester resin resulting from the curing of said mixture, and the amount of complexing compound being in the range of from 0.001 to 0.02% by weight based on the weight of polyester resin resulting from the curing of said mixture.

11. A polycondensation-copolymerizable mixture according to claim 10 wherein the cobalt salt conforms to the formula $CoX_2$ wherein X is selected from the class consisting of chlorine, bromine, iodine, thiocyanate and cyanate, and wherein the complexing compound is selected from the class consisting of 6,6'-dimethyl-2,2'-bipyridine; and 4,4',6,6'-tetramethyl-2,2'-bipyridine.

12. A polycondensation-copolymerizable mixture according to claim 8 wherein said cobalt-accelerator curing component is present in said mixture in the form of a cobalt complex which has a structure conforming with a structural formula selected from the class consisting of $[CoX_2]^{++}$ and $[CoX(RCOO)_2]$ and $[CoXRCOO]^+$ and $[CoXZ_2]$ wherein X represents the complexing compound selected from the 2,2'-bipyridines as specified, wherein R represents and alkyl radical having from 1 to 17 carbon atoms, wherein RCOO in the group $(RCOO)_2$ represents a naphthenic acid radical; and wherein Z is an acid radical; the amount of such cobalt complex present in the mixture being within the range of from 0.0005 to 0.006% by weight expressed as cobalt metal and based on the weight of polyester resin resulting from the curing of said mixture.

13. A polycondensation-copolymerizable mixture according to claim 8 wherein said cobalt-accelerator curing component is present in said mixture in the form of dichloro-4,4',6,6'-tetramethyl-2,2'-bipyridine cobalt (II);

the amount of cobalt complex being within the range of from 0.0005 to 0.006% by weight expressed as cobalt metal and based on the weight of polyester resin resulting from the curing of said mixture.

14. A polycondensation-copolymerizable mixture according to claim 8 containing a polymerization inhibitor component in an amount within the range of from 0.0001 to 0.2% by weight based on the weight of polyester resin resulting from the curing of said mixture.

References Cited by the Examiner

UNITED STATES PATENTS

| | | | |
|---|---|---|---|
| 2,843,556 | 6/1958 | Moorman | 260—863 |
| 2,921,873 | 1/1960 | Rogers | 260—864 |
| 2,931,784 | 4/1960 | Raymond | 260—863 |

MURRAY TILLMAN, *Primary Examiner.*

J. T. GOOLKASIAN, *Assistant Examiner.*